No. 642,348. Patented Jan. 30, 1900.
A. H. MARKS.
PNEUMATIC TIRE FOR VEHICLES.
(Application filed May 3, 1899.)
(No Model.) 2 Sheets—Sheet 1.
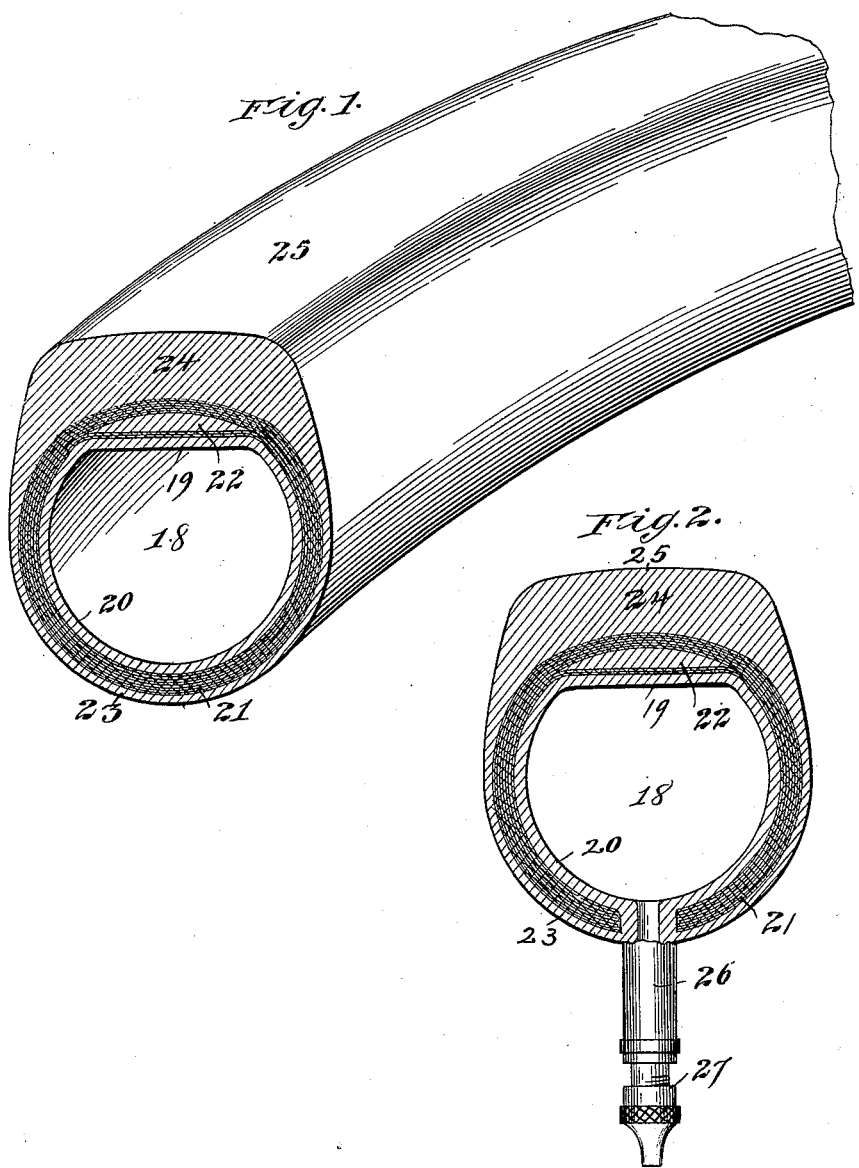
Witnesses.
F. S. Mann
Frederick F. Goodwin
Inventor,
Arthur H. Marks,
By Offield, Towle & Linthicum,
Attys.

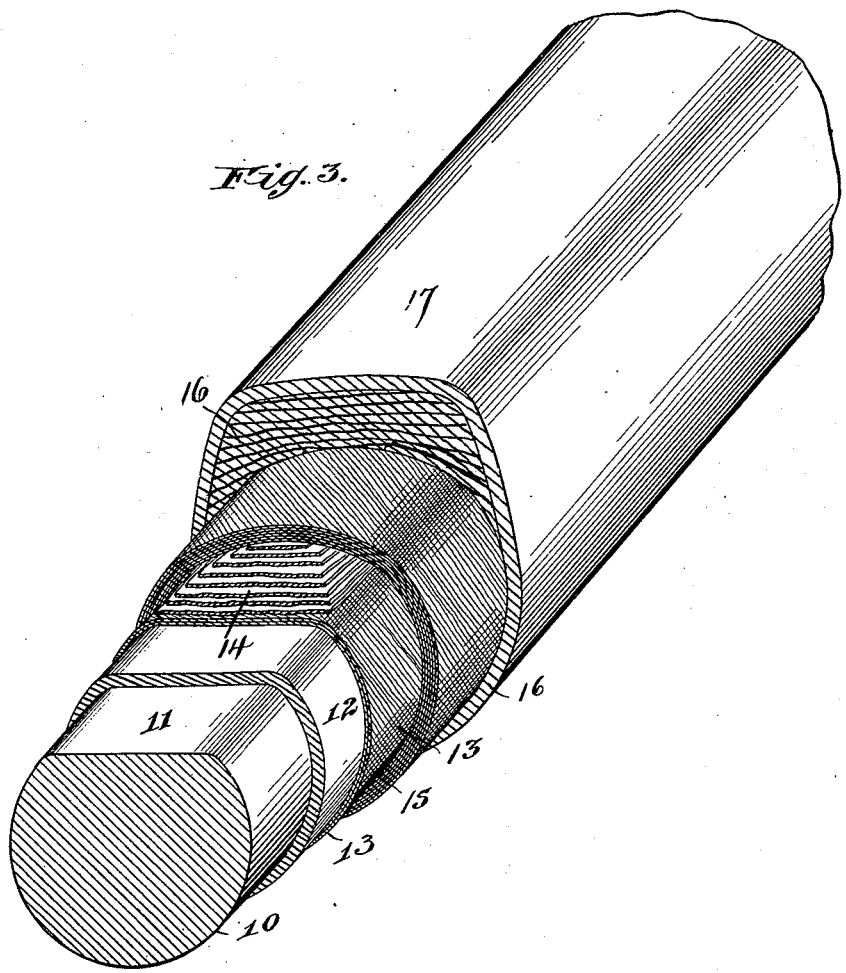

UNITED STATES PATENT OFFICE.

ARTHUR H. MARKS, OF AKRON, OHIO, ASSIGNOR TO THE DIAMOND RUBBER COMPANY, OF SAME PLACE.

PNEUMATIC TIRE FOR VEHICLES.

SPECIFICATION forming part of Letters Patent No. 642,348, dated January 30, 1900.

Application filed May 3, 1899. Serial No. 715,445. (No model.)

*To all whom it may concern:*

Be it known that I, ARTHUR H. MARKS, of Akron, in the county of Summit and State of Ohio, have invented certain new and useful Improvements in Pneumatic Tires for Vehicles, of which the following is a specification.

This invention relates to pneumatic tires for vehicles, and more particularly to that class of pneumatic tires intended for use on carriages, buggies, automobiles, and similar vehicles, and has for its object to provide a tire of this character which will present a broad tread-surface by means of which its traction may be increased, said tire being adapted to resist puncture by reason of its construction and being adapted for production with a material saving in the amount of rubber used.

To these ends my invention consists in certain novel features which I will now proceed to describe and will then particularly point out in the claims.

In the accompanying drawings, Figure 1 is a perspective view, partly in section, of a tire embodying my invention. Fig. 2 is a transverse sectional view thereof, and Fig. 3 a perspective view illustrating the mode of construction of the tire.

Referring to said drawings, I will first describe the manner in which my improved tire is constructed or built up, the same being more particularly illustrated in Fig. 3 of the drawings, in which 10 indicates a mandrel which has a flattened portion 11 extending longitudinally thereof. Around this mandrel is formed a tube 12 of rubber, and this tube is in turn inclosed by or wrapped around with a wrapping of fabric 13. Two layers of this fabric (more or less) are first wrapped around the rubber tube 12, and there is then formed upon the flattened portion of the fabric above the flattened side of the mandrel a body of rubber 14, built up in strips of successively decreasing width until the entire body is approximately circular in cross-section. The fabric is then again wrapped around the partially-completed tire until about six plies or layers of the fabric surround the portion thereof already on the mandrel, this outer wrapping of fabric being designated by the numeral 15. A thickened tread portion 16 is then built up of strips of rubber, so as to form a broad flat tread-surface 17, and this rubber is also carried around the fabric 15, so that the whole tire is inclosed in a covering of rubber. The tire thus built up is vulcanized in a mold in the usual manner, and it will of course be understood that during this operation the several parts of the rubber which are in contact with each other become one continuous body separated by the intervening layers of fabric. The resultant product is the tire shown in Figs. 1 and 2, which has a central air-space 18, flattened at one side, as shown at 19, and inclosed and defined by a tube 20 of rubber. This tube is in turn inclosed by a tube 21, formed of a number of layers or plies of fabric separated at the outer portion of the tire for the insertion between the said layers or plies of an insert 22 of rubber, so shaped that while the under side of the said insert and the fabric adjacent thereto are flattened to conform to the flattened outer wall of the air-chamber the outer portion of the rubber insert and that portion of the fabric tube which lies outward therefrom are so curved as to conform in a general way to a cylindrical shape. The tire is completed by an outer tube or covering 23 of rubber, having a very much thickened tread portion 24 and a broad flat tread-surface 25. The tire is of course provided with an air-inlet tube 26 to receive a valve 27, these parts being constructed in any approved manner.

It will be observed that the tire thus constructed presents a broad flat tread-surface, which not only gives a firmer support to the vehicle and enhances the easy riding qualities thereof, but is also of special advantage when the tire is applied to vehicle-wheels of the automobile class, in that the increase in bearing-surface and consequent increase in frictional contact area gives increased tractional power to the tire and wheel. The increased thickness of the tread reduces the liability to puncture, and this liability is further decreased by the fact that the fabric 21 is carried out more closely to the tread and farther away from the air-chamber than it would be if the rubber insert 22 were omitted and the fabric wound continuously, so as to be entirely flat as to its outer portion. By the employment of an air-chamber having a flat outer portion or wall I obtain a tire having a definite thickness of tread—i. e., a definite thickness of material between the tread-surface 25 and the flattened wall 19 of the air-chamber—while at the same time the size of the tire is not unduly increased, and a comparatively large amount of rubber is thereby saved. It will be seen that if the tire had an air-chamber circular in cross-section and of the same maximum diameter as that shown the diameter of the tire from tread-surface to its innermost surface would be materially increased and the amount of rubber employed correspondingly increased. It will also be observed that the maximum radial thickness of the tire is found upon radial lines drawn from the center of the tire to the lines of junction of the flat tread-surface with the sides of the tire, so that a maximum of strength and consequent resistance against the severe strains brought upon the tire along these lines is obtained.

I do not wish to be understood as limiting myself to the precise details of construction hereinbefore described, and shown in the accompanying drawings, as it is obvious that the details may be varied without departing from the principle of my invention.

I claim—

1. A pneumatic tire for automobiles and other heavy vehicles, consisting of an inner continuous tube of rubber, an intermediate continuous tubular strengthening-jacket of fabric, and an outer covering of rubber, the outer portion whereof is thickened and flattened on its tread-surface, the several elements being united by vulcanization to form a single unitary tube, the body whereof is cylindrical, continuous and of equal thickness and strength throughout, except as to its tread portion, said tread portion being broad and flat and the air-chamber having that portion of its walls adjacent to the tread correspondingly flattened, whereby a thickened tread is produced without an undue increase in the diameter of the tire, the maximum radial thickness of the tire being upon radial lines extending from the center of the tire to the lines of junction of the flat tread with the sides thereof, substantially as described.

2. A pneumatic tire for vehicles, having a broad flat tread portion, an air-chamber correspondingly flattened on its adjacent side to increase the thickness of the tread, and a tubular body of fabric embedded in the rubber and having its outer portion curved outward away from the air-chamber and toward the tread-surface of the tire, substantially as described.

3. A pneumatic tire for vehicles, having a broad flat portion, an air-chamber having its outer wall flattened to increase the thickness of the tread, and a tubular body of fabric embedded in the rubber and composed of a plurality of layers or plies, the innermost of which follow the contour of the air-chamber, while the outer plies are curved outward away from the flattened wall of the air-chamber, a strip or insert of rubber being located in the space thus formed between the two sets of plies, substantially as described.

4. The hereinbefore-described improvement in the method of constructing a pneumatic tire, consisting in forming upon a cylindrical mandrel having a flattened side a similarly-flattened tube of rubber, partially wrapping said tube with fabric, building out the flattened portion with rubber and completing the fabric wrapping to form a substantially cylindrical body, and applying an external covering of rubber, substantially as described.

5. The hereinbefore-described improvement in the method of constructing a pneumatic tire, consisting in forming upon a cylindrical mandrel having a flattened side a similarly-flattened tube of rubber, partially wrapping said tube with fabric, building out the flattened portion with rubber and completing the fabric wrapping to form a substantially cylindrical body, and applying to the exterior of this body an outer covering of rubber having a thickened tread portion with a broad flat tread-surface on the same side of the tire as the flattened wall of the mandrel, substantially as described.

ARTHUR H. MARKS.

Witnesses:
WALTER B. HARDY,
WILLIAM B. MEELER.